Feb. 2, 1932.  O. H. BANKER  1,843,194
VARIABLE SPEED TRANSMISSION
Filed July 31, 1930    6 Sheets-Sheet 1
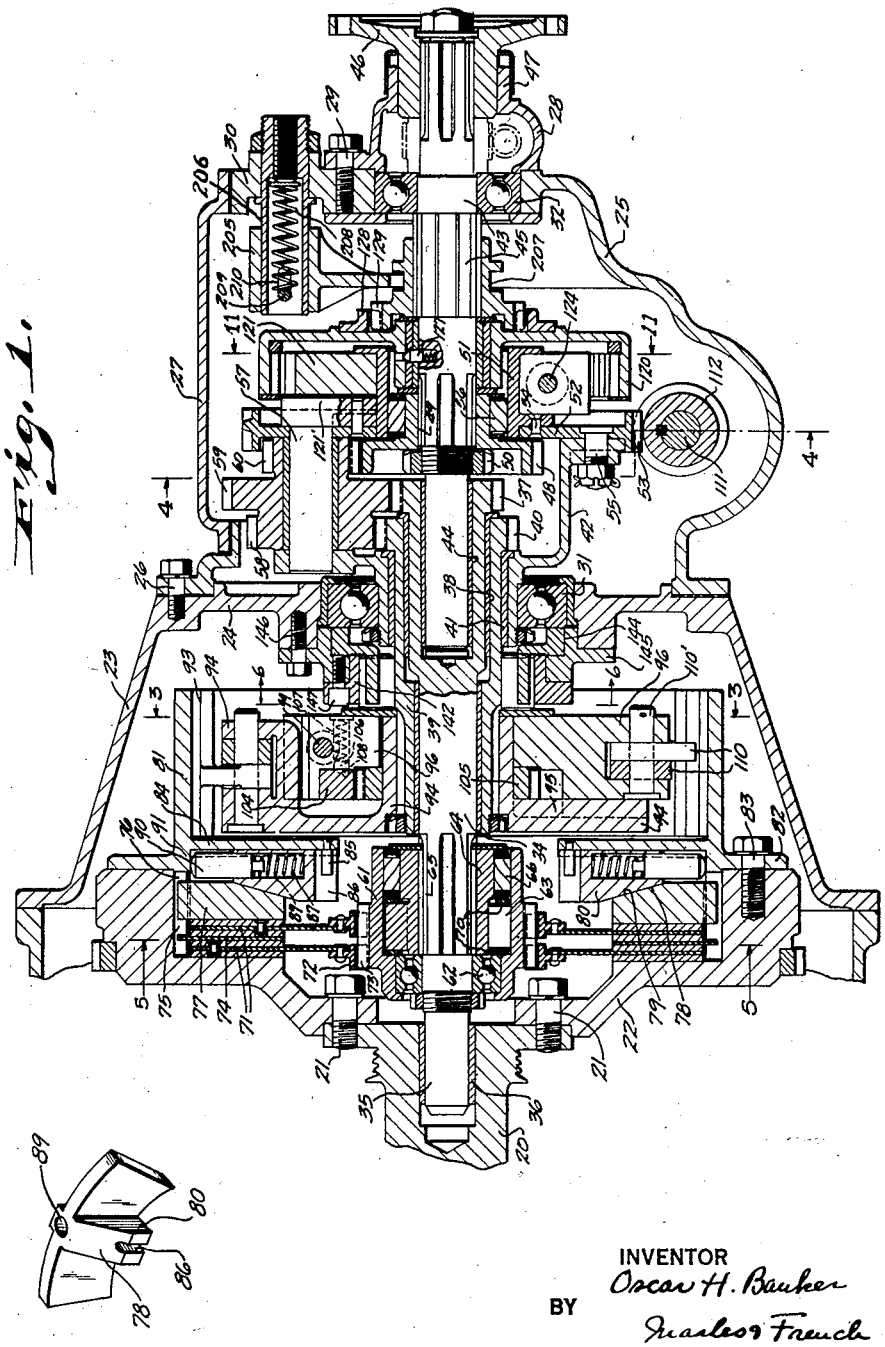
INVENTOR
Oscar H. Banker
BY
Charles French
ATTORNEYS Feb. 2, 1932. O. H. BANKER 1,843,194
VARIABLE SPEED TRANSMISSION
Filed July 31, 1930 6 Sheets-Sheet 2
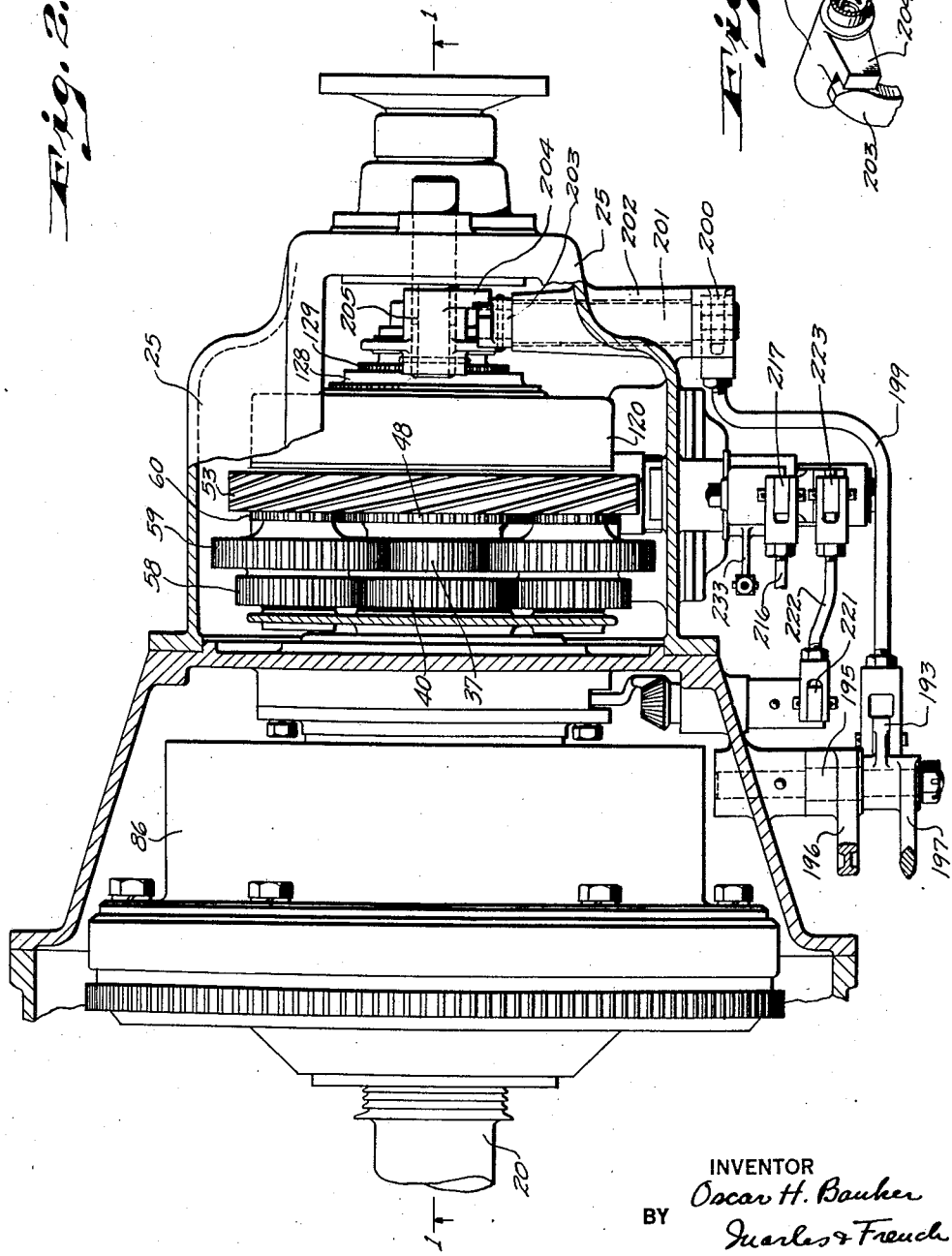
INVENTOR
Oscar H. Banker
BY
Quarles & French
ATTORNEYS

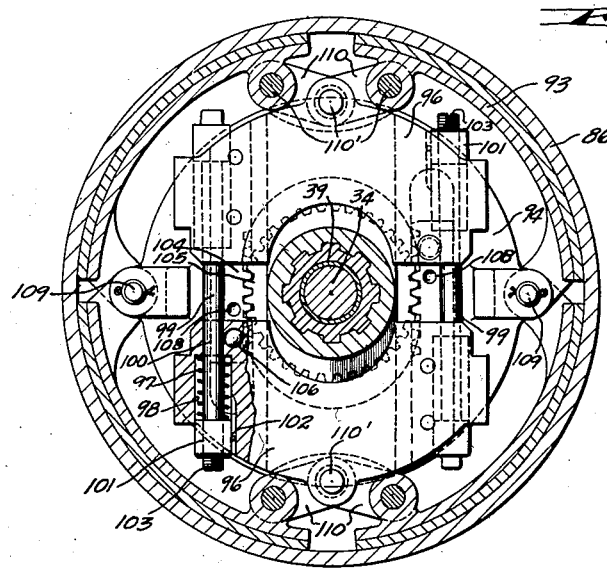
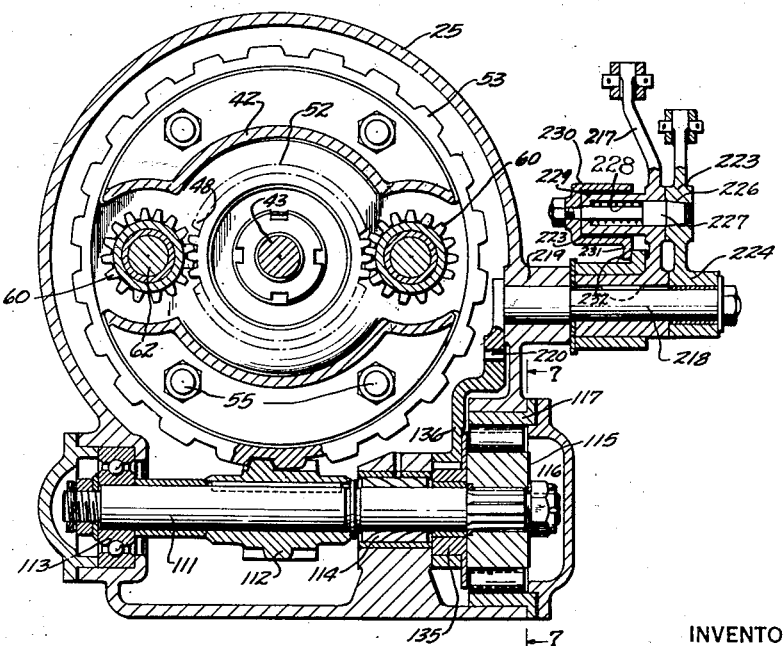

Feb. 2, 1932.     O. H. BANKER     1,843,194
VARIABLE SPEED TRANSMISSION
Filed July 31, 1930     6 Sheets-Sheet 4
Fig. 6.
Fig. 8.
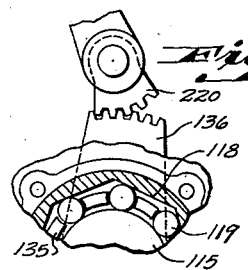
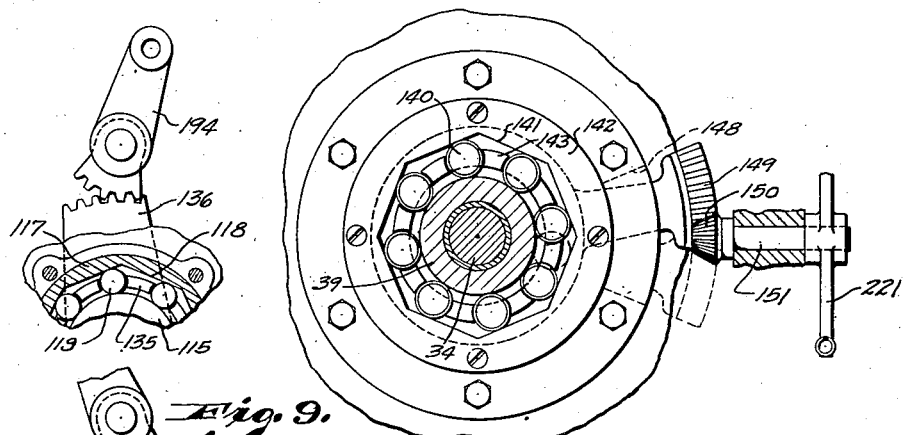
Fig. 9.
Fig. 5.
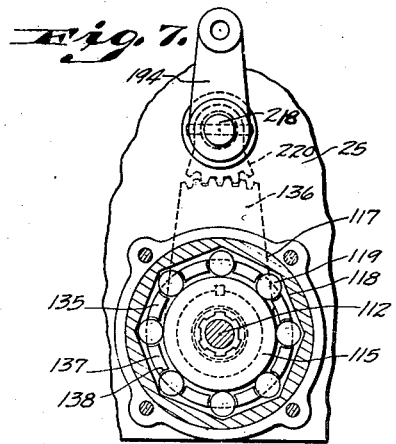
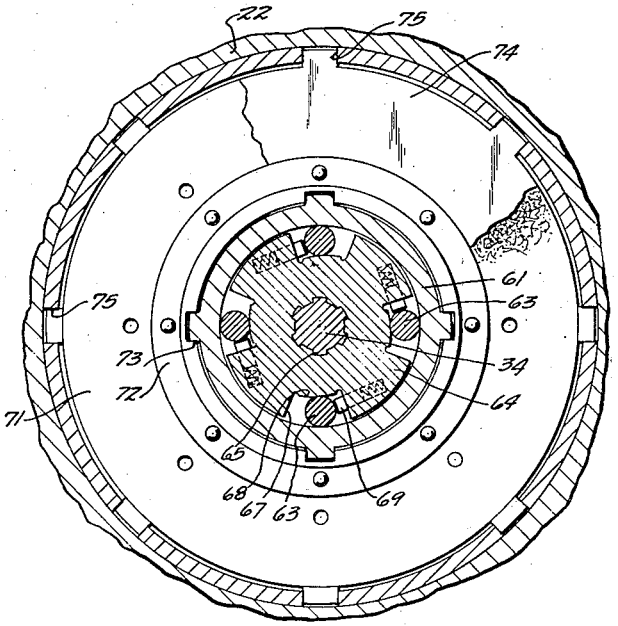
INVENTOR
Oscar H. Banker
BY
Quarles & French
ATTORNEYS Feb. 2, 1932.  O. H. BANKER  1,843,194
VARIABLE SPEED TRANSMISSION
Filed July 31, 1930   6 Sheets-Sheet 5
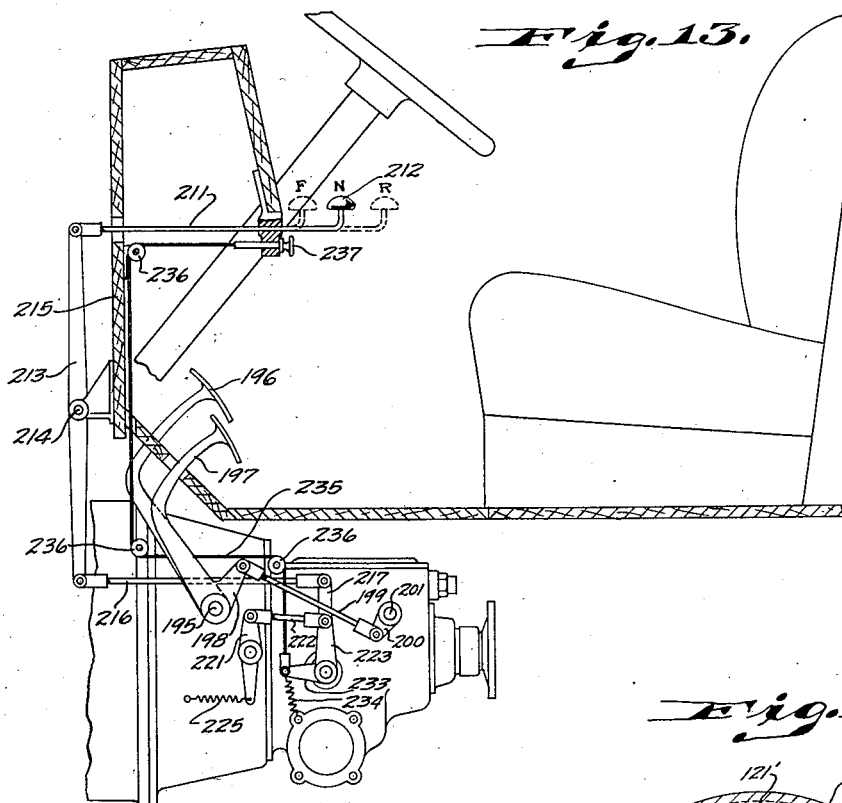
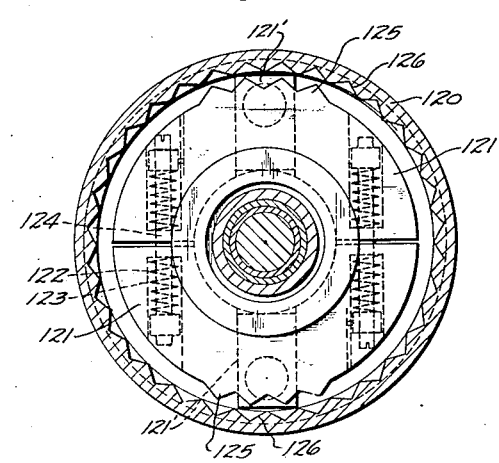
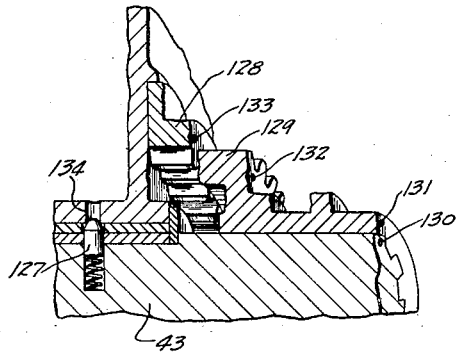
INVENTOR
Oscar H. Banker
BY
Quarles & French
ATTORNEYS

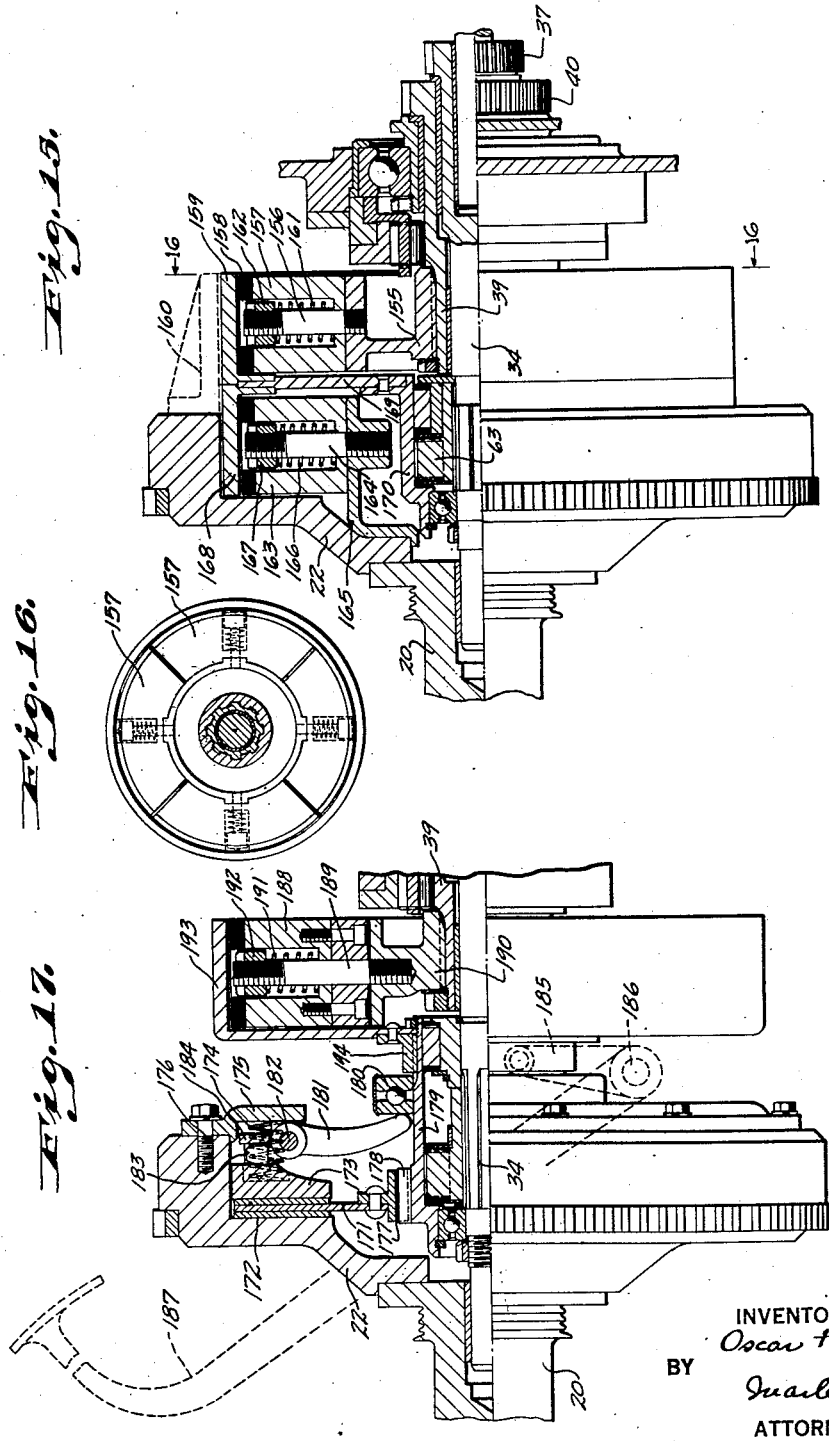

Patented Feb. 2, 1932

1,843,194

UNITED STATES PATENT OFFICE

OSCAR H. BANKER, OF CHICAGO, ILLINOIS, ASSIGNOR TO CONTINENTAL ILLINOIS BANK & TRUST COMPANY, OF CHICAGO, ILLINOIS, A CORPORATION OF ILLINOIS, AS TRUSTEES

VARIABLE SPEED TRANSMISSION

Application filed July 31, 1930. Serial No. 472,125.

The invention relates to automatic change speed transmissions and more particularly to those of the planetary gear type.

One of the objects of the present invention is to provide a change speed transmission mechanism of the type above described wherein three changes in speed and reverse can be effected from a single epicyclic gear unit.

A further object of the invention is to provide a change speed transmission mechanism wherein the planetary gearing includes a plurality of drive gears, one of said gears being a low speed gear and in which said gears are selectively connected to the source of power through clutch mechanisms, the clutch mechanism for the low speed gear including an overrunning clutch and the clutch mechanism for the other drive gear being automatically operable to connect said gear to the power source on an increase in speed of the planet gears above a predetermined speed.

A further object of the invention is to provide a novel arrangement and association of parts for locking the transmission in second gear.

A further object of the invention is to provide a transmission of the type above described with simple manual controls for respectively effecting the reverse and the immediate change from "high" to "second" speed without reducing the speed of the driven shaft when in "high."

The invention further consists in the several features hereinafter set forth and more particularly defined by claims at the conclusion hereof.

Referring to the drawings, Fig. 1 is a vertical sectional view through a transmission embodying the invention, taken on the line 1—1 of Fig. 2 except that one set of the planet gears have been shown as displaced through an angle of ninety degrees on the carrier from that shown in Fig. 2 to facilitate the explanation of the operation of the apparatus;

Fig. 2 is a plan view of the transmission, parts of the casing being broken away and parts being shown in section;

Fig. 3 is a detail vertical sectional view taken on the line 3—3 of Fig. 1;

Fig. 4 is a vertical sectional view taken on the broken line 4—4 of Fig. 1;

Fig. 5 is a detail sectional view taken on the line 5—5 of Fig. 1;

Fig. 6 is a detail sectional view taken on the line 6—6 of Fig. 1, parts being broken away;

Fig. 7 is a detail sectional view taken on the line 7—7 of Fig. 4;

Figs. 8 and 9 are views similar to Fig. 7, showing the parts in different operating positions, parts being broken away;

Fig. 10 is a perspective view of one of the engine clutch actuating elements;

Fig. 11 is a detail sectional view taken on the line 11—11 of Fig. 1;

Fig. 12 is a detail perspective view of parts of one of the control clutches;

Fig. 13 is a side elevation view of the transmission embodying the invention showing its installation in an automotive vehicle;

Fig. 14 is a detail perspective view of one of the control connections;

Fig. 15 is a view partly in elevation and partly in vertical sectional showing certain modifications in the clutch mechanism.

Fig. 16 is a detail sectional view taken on the line 16—16 of Fig. 15.

Fig. 17 is a view similar to Fig. 15 showing other modifications of clutch mechanism.

Referring to the drawings, and more particularly Fig. 1, the numeral 20 designates the drive shaft or crank shaft of the engine connected by bolts 21 to the fly-wheel 22 of the engine enclosed in the housing formed by a part of the engine crank case and a housing section 23 detachably secured thereto and provided with an end plate portion 24 and housing certain elements of the transmission while the casing section 25 secured to the first section by the bolts 26 and provided with a removable top cover 27 houses other parts of the transmission and has a speedometer housing 28 secured to the end thereof by bolts 29.

The end plate 24 and the outer end 30 of the section 25 are respectively equipped with ball bearing journals 31 and 32. A drive shaft 34 has one end 35 journalled in the bushed bore 36 of the crank shaft and has a gear 37 at its other end formed integral therewith or connected thereto and at this end is journalled in the bushed bore 38 of the hollow or tubular drive shaft 39 provided with a gear 40 and in turn journalled in the bearing 41 of the part 42 of a planet gear carrier which part in turn is journalled in the ball bearing journal 31.

A driven shaft 43 has one end journalled in the bushed bore 44 in the shaft 34 and its other end journalled in the bearing 32 and has a propeller shaft coupling flange 46 splined to it and extending loosely through the end 47 of the speedometer housing 28. The shaft 43 has the driven gear 48 splined to it as at 49 and secured against endwise movement in one direction by a suitably locked nut 50.

The planetary gear carrier in addition to the part 42 includes a spider or flanged disk 51 which is connected to the web 52 of a lock gear 53 as by rivets 54 and which gear in turn is secured to said part 42 by bolts 55. The hub of the disk 51 is journalled on bearing rollers 56 working between it and the hub of the gear 48.

The parts 42 and 52 have planet shafts 57 secured thereto on which the planet gears 58, 59 and 60 are mounted, these gears preferably being integrally formed compound gears and meshing respectively with the gears 40, 37 and 48.

Before proceeding with a detailed description of the clutch elements it is to be noted that low speed is obtained when gear 37 is the driver and the planet gear carrier is held against rotation, the drive then being from the shaft 34 through gears 37, 59, 60 and 48 to the driven shaft 43; that second speed is obtained when gear 40 is the driver and the planet gear carrier is held against rotation, the drive then being from shaft 39, through gears 40, 58, 60 and 48 to the shaft 43; that high speed is obtained when the planet carrier and its gears revolve with the shafts 34 and 43; and that reverse is obtained when the planetary carrier is allowed to rotate freely and the shaft 39 held against rotation while gear 37 meshing with gear 59 drives the planetary carrier around gear 40 in an anticlock-wise direction and thus through gear 60 drives the gear 48 and the shaft 43 in the reverse direction to that of the shaft 34.

For obtaining the drive from the shaft 20 to the shaft 34 I show in Figs. 1, 5, and 10 one arrangement of clutch mechanism. Upon the shaft 34 is mounted an overrunning clutch comprising a clutch drum 61 whose hub is journalled on the ball bearing journal 62 mounted between it and the shaft 34, said clutch drum having clutch rollers 63 cooperating therewith and with an actuator 64 splined at 65 to the shaft 34 and carrying roller bearings 66 which form journals for the outer end of the drum 61. As shown in Fig. 5 the actuator has wedging recesses 67 formed therein and in which the clutch rollers 63 work and are adapted to be wedged by the inclined or wedging surfaces 68 of said recesses into locked engagement therewith and with the drum in one direction of rotation and to be released from the drum in the event shaft 34 runs faster than drum 61, each of said rollers being normally urged toward clutched position by a spring pressed plunger 69 and being prevented from free end movement by plates 70.

For connecting the drum 61 with the shaft 20 I provide a disk plate clutch which in this showing is automatically operated to secure the two-fold advantage of relieving the operator of the necessity to connect the engine to the transmission and of keeping the length of the transmission as short as possible. This clutch includes the lined clutch plates 71 which are secured to flanged rings 72 having slidably keyed or splined connections 73 with the outer part of the drum 61 and the annular clutch disk or plate 74 interposed between the lined surfaces of the plates 71 and having slidably keyed or splined connections 75 with the splines formed in that part of a drum 81 mounted on the inner face of the rim of the fly-wheel 22. Also slidably splined or keyed to this face of the fly-wheel as at 76 is an annular pressure plate 77 having one face movable into abutting engagement with the clutch plates and the other face provided with an inclined or wedged surface 78 adapted to be engaged by the inclined or wedging surfaces 79 of speed responsive elements or weights 80. A drum 81 has a flanged portion 82 secured to the rim of the fly-wheel by bolts 83 and provided with an annular ring or plate portion 84 upon which the weights 80 are suitably guided to move radially outwardly and to form a driving connection therewith. A plurality of these weights 80, for example four, are equidistantly spaced about the ring 84 and their inward movement is limited by stop pins 85 secured to said ring and working in slots in 86 in said weight. Free outward movement of each weight is resisted by a spring 87 mounted in a recess 89 in the weight and interposed between the same and a pin 90 slidably guided in the weight and bearing against an annular face 91 of the drum 81. With this construction when the engine is not running the plate clutch above described is disconnected but after the engine has been started and the speed of the fly-wheel 22 and ring portion 81 becomes such as to overcome the inertia of the weights 80 and the pressure of the springs 87, said weights then move outwardly under the action of centrifugal force into wedging contact with the pressure plate 77 which then moves into pressure contact with the clutch plates 71 and 74 above described and thus connects the drum 61 for rotary movement with the fly-wheel and this causes the rollers 63 to assume a driving position relative to said drum and the actuator 64 with the result that the shaft 34, and hence gear 37, is then turned by the engine to drive the planetary gearing to provide the low gear or first speed drive.

While in low gear the gear 58 being a part of the compound planet gears and in mesh with the gear 40, causes said gear 40 to turn in a clock-wise direction at a higher speed than the gear 48 associated therewith and at a predetermined speed, for example five to eight miles per hour car speed, causes the operation of a speed responsive clutch mechanism that connects the shaft 39 with the fly-wheel 22 to obtain second speed through the epi-cyclic gear train as previously set forth, and permits of the automatic driving release of the shaft 34, through the overrunning clutch rollers 63.

Referring to Figures 1 and 3, the speed responsive clutch mechanism includes the drum 81 and governor operated clutch elements 93 connected to be driven by the shaft 39 and movable into operative connection with said drum. The shaft 39 has a supporting member 94 splined thereto and provided with key portions 95 upon which the speed responsive elements or governor weights 96 are slidably mounted and driven by the member 94, said weights moving outwardly under the action of centrifugal force. Resistance to outward movement of these weights until a predetermined speed is attained is afforded by springs 97 mounted in bores 98 in the end portions of said weights and surrounding rods or bolts 99 which are loosely mounted in bores 100 in said weights and carrying tension-adjusting nuts 101 for said springs, which nuts are slidably keyed as at 102 to the weights so that by turning the rods 99 from the slotted ends 103 the desired tensioned adjustment of the springs is obtained. For securing synchronization of the outward movement of the weights 96, a rack 104 is fixed to one end of each weight and meshes with a gear 105 loose on the hub of the member 94 and in order to prevent hunting of the governor weights the same are releasably locked either in contracted or expanded position by means of spring pressed detents such as the balls 106 which are mounted in sockets 107 in each weight and are adapted to engage in either of the locking recesses 108 in the rack 104 of the other weight whereby, until a certain predetermined speed is reached, the weights are held in their contracted position and then on overcoming the tension of the springs 97 and the pressure of the spring pressed balls 106 move out quickly to expanded position where they are again locked against return until a definite lower speed has been reached so that they may again move to a contracted position. The clutch elements 93 are pivotally connected at one end to the support 94 by the pivot pins 109 and are operatively connected at their other ends to the weights 96 by the links 110 and their pins 110' with the result that when the weights are in contracted position said clutch elements or shoes 93 are free of the drum and when said weights are in their expanded position said clutch elements are held by the weights in engagement with the drum, it being understood that the locking detents may permit the weights to move outwardly beyond their expanded locking position to secure the proper engagement of the clutch elements with the drum but offer a definite resistance to the movement of the weights to a contracted position until said weights can be moved thereto with a definite snap action. Fig. 1 of the drawing shows a composite section of the above clutch in which the pivot mounting 109 has been displaced through an angle of ninety degrees.

In the conditions of low and second speed as the change speed gear unit is of the planetary gear type there is a tendency of the planetary gear carrier to be revolved in the reverse direction to the driven gear and means are provided herein to utilize this tendency to automatically lock the planetary gear carrier against reverse movement which means are shown more particularly in Figures 1, 4, 7 and 9. The gear 53, secured to the planetary gear carrier, is a spiral gear reducedly intergeared with a brake operating shaft 111 by meshing with the spiral gear 112 fixed to said shaft. The shaft 111 is journalled in the lower portion of the casing section 25 in a ball bearing journal 113 and a roller bearing journal 114 and has a brake actuator 115 splined or otherwise fixed thereto and forming a part of an automatic one-way roller brake mechanism 116. This mechanism also includes a drum or cam 117 fixed to the transmission casing and provided with inclined wedge surfaces 118 adapted to be engaged by the rollers 119 interposed between said surfaces and the actuator 115. While the operative positions of these rollers are under manual control, for purposes hereinafter described, for the purpose of the description thus far it may be assumed that these rollers are in the position shown in Fig. 8 where on the tendency of the planetary carrier to rotate backwards the actuator 115 is moved in a clock-wise direction which causes the rollers to become wedged between said actuator and the stationary wedge surfaces 118 and thus stop the backward rotation of the planetary gear carrier. However it will be noted that when the planetary gear carrier is rotated in a clock-wise direction by the driven member, it will release the automatic brake mechanism.

Thus with the present construction, while in low gear we have seen that the gear 58 causes the gear 40 to turn in a clock-wise direction at a higher speed than the gear 48 and when the speed of the gear 40, its shaft 39 and the governor operated clutch mechanism just described reach a predetermined value, the clutch elements 93 are moved to engage the drum 81 and the drive then being from the fly-wheel to the shaft 39, the gear 40 begins to revolve at engine speed and therefore gears 58, 59 and 60 revolve at a higher speed and consequently gear 48 and shaft 43 are driven at a higher or second speed. Under these conditions gear 59 being of larger diameter and revolving at a higher rate of speed at this instant causes gear 37 to revolve much faster than engine speed and such increases in speed relatively speaking, being the same as running the fly-wheel 22 backwards or in a counter-clock-wise direction, the rollers 63 of the overrunning clutch are released and while shaft 34 is free to turn the drive is from the engine shaft, fly-wheel 22, drum 81 and its clutch mechanism, shaft 39, gear 40, 58, 60 and 48 to the shaft 43 with the vehicle in second speed.

It has been noted that the automatic brake mechanism preventing backward rotation of the planetary gear carrier may be released when the driven shaft reaches or exceeds the speed of the driver and this movement of the brake to disengaging position may be effected by the operator's partial deceleration of the engine temporarily so as to give the driven shaft a chance to reach the speed of the driver as by the operator's partial closure of the throttle valve of the engine. Consequently when the vehicle is in second speed and the driver wishes to go into high gear or direct drive, he partially decelerates the engine and allows the driven shaft to synchronize with the driving element of the gear and in doing so release the planet carrier from the automatic brake mechanism and the automatic clutch mechanism now to be described operates to lock the planet gear carrier to a drum 120 which is then connected in driving relation with the shaft 43 and the vehicle is then in high gear.

One form of automatic clutch mechanism is shown more particularly in Figures 1 and 11 and includes a pair of centrifugally operated clutch weights or shoes 121 slidably guided on keys 121' secured to the web 52 of the gear 53 and by which said weights are driven and move radially outwardly against the opposing resistance of springs 122 mounted in bores 123 of these shoes upon rods 124 of a type similar to the rods 99 of the clutch mechanism shown in Fig. 3 and similarly provided with means for adjusting the tension of said springs. These shoes preferably have serrated face portions 125 adapted for movement into inter-meshed clutching relation with the serrated or tooth rim portion 126 of the drum 120. The teeth or serrated portions of these clutch elements have gradually sloping sides so that they will intermesh with each other without appreciable shock and this action is further brought about by running these parts in oil so that the side of the serrations 125 at the start of engagement will slide along a film of oil on the teeth 126 and be resisted by oil in the pockets of the teeth before final movement to clutched position.

It will now be observed that so long as the planetary gear carrier stands still, the weights or shoes 121 do not move. When, however, the operator of the vehicle decides that he is going fast enough in gear and wishes to change to high gear, he brings about a synchronization of the drive and driven shafts so as to permit the release of the automatic brake mechanism of the planetary carrier and allow it to rotate with its driven gear 48, thereby causing the shoes 121 on said carrier to move outwardly into clutching engagement with the clutch drum 120 so that the epi-cyclic gear train then revolves as a unit with the drive shaft 20 and driven shaft 43, the shaft 39 being then connected with the drive shaft 20 through the clutch mechanism previously described and the vehicle is then in direct drive or high gear.

When the vehicle is in high or direct gear, if its speed is diminished or it slows down to such an extent as to permit the springs 122 to release the clutch elements 120 of the high gear automatic clutch, the one-way automatic brake for the planetary gear carrier will again hold said carrier stationary and the vehicle will then proceed in second gear and a further reduction in speed will permit the springs 98 to move the weights 96 to contracted position and hence release the clutch elements 93 from the drum 81 and the vehicle will then proceed in low gear. When also with the present construction the vehicle is in high gear and the torque of the engine is increased relative to the load of the vehicle and the torque of the engine is higher than that produced by the action of the shoes 121 on the drum 120, the slope angles of the intermeshing teeth of this high speed clutch mechanism will force the weights into a contracted position causing a slip and bringing the second speed gear unit again into operation. As soon as the second speed gear ratio has been effected the planetary carrier comes to a dead stop and the weights 121 have then moved to their contracted positions and the drum 120 is then free to rotate with the driven shaft. Thus the construction of the high speed clutch is such as to cause a release of the high speed driving relation on an increase in torque of the engine over that of the driven shaft.

It is sometimes highly desirable in driving to change immediately from high to second and in order that the operator, with the present automatic shift, may not have to wait for a reduction in speed of the vehicle to effect this change, means have been provided, under the control of the operator, for immediately placing the vehicle in second gear. For this purpose the drum 120 is loose on the shaft 43, except for a readily releasable spring pressed detent 127, and carries a clutch gear 128 which is engaged by a clutch gear 129 whose hub is keyed to the shaft 43 by the splines 45 and hence a shifting of gear 129, under manual control, out of mesh with its companion gear 128 will release the drum 120 and hence allow the vehicle to proceed immediately in second gear regardless of the engagement at that instant of the automatic high speed clutch.

High speed relationship may again be obtained by shifting the clutch gear 129 back into operative position but under these conditions it is desirable that these clutch elements line up properly during the shift. For this purpose the splined portion 45 of the shaft and the hub of the clutch gear 129 as well as certain teeth of the gear 129 and the gear 128 are made to line up accurately during manufacture, such a line up being indicated by the points 130, 131, 132 and 133 of these parts as shown in Fig. 12 and the location of the spring pressed detent 127 in shaft 43 and the hole 134 in the hub of the drum that receives this detent are aligned with the points 130 to 133 so that the drum 120, after being stopped by the planetary carrier, will be started again in rotation by the pin 127 engaging in the hole 134 as the shaft 43 rotates and when it is so engaged the gear 128 will line up properly with the intermeshing clutch gear 129.

After the clutch gears 128 and 129 are again engaged and the drum 120 is in driving engagement with the driven shaft, the operator may proceed as initially described to put the vehicle in high gear.

For effecting the reverse drive through the epicyclic gear train, means have been provided for holding the shaft 39 against rotation while allowing the drum 120 to rotate freely and for controlling the one-way brake of the planetary carrier to allow said carrier to rotate freely in its reverse rotation.

For releasing the one-way brake of the planetary carrier I have shown in Figs. 4, 7, and 9 a means for shifting the brake rollers 119 to a neutral or reverse position which consists of a roller operating disk 135 loosely mounted on the shaft 111 and keyed to a segmental gear 136, under manual control as hereinafter described, said disk having a flanged portion 137 provided with slots 138 in which the rollers 119 work and by which they are confined to certain zones of operation relative to the brake drum or cam 117, it being noted that when the disk 135 is in the neutral position shown in Fig. 7 or in the position shown in Fig. 9 the rollers 119 cannot engage the drum to hold the carrier against reverse rotation and consequently the planetary gear carrier is free to revolve in the reverse direction about the gear 48 and the drum 120 is free to revolve on the shaft 43 since for reverse drive the clutch gear 129 is preferably disengaged from the clutch gear 128. In order to complete the reverse operation by the holding of the shaft 39 against rotation I provide an overrunning clutch or one-way brake shown in Figs. 1 and 6, which in one position, the dotted-line position shown in Fig. 6, is used to accomplish this purpose. This includes the rollers 140 engageable with the shaft 39 and with the wedge shaped surfaces 141 formed in a stationary drum 142 fixed to the end plate 24. The brake rollers 140 are shifted between the full and dotted line positions of Fig. 6 by means of a roller operating disk 143, similar to the disk 135, and loosely mounted in a bearing recess 144 of a collar 145 secured to the end plate 24 by bolts 146 and to which the drum 142 is secured by bolts 147. The collar 145 and a portion of the end plate 24 is slotted at 148 to provide a working space for an arm 149 extending outwardly from the disk 143 and provided with a segmental gear portion 149 meshing with the bevel pinion 150 on the control shaft 151. Under these conditions with drum 120 released, the roller clutch 116 in position in Fig. 9 when the shaft 34 is rotating clock-wise in low gear with the rollers 141 shifted to the dotted line position shown in Fig. 6, the drive of the gear 59 from the gear 37 will act to turn the planetary gear carrier in an anti-clock-wise direction with the gear 58 revolving about the gear 40, which is then held stationary through the automatic brake provided by the rollers 140, and the gear 60 then drives the shaft 43 through the gear 48 in the reverse direction to the drive shaft 34.

When the disk 143 is shifted to bring the rollers 140 to the full-line position as shown in Fig. 6 they are in the normal running position of the transmission in which the rotation of the shaft 39 in the forward direction will not cause any braking action.

It is a general practice in driving, that while descending steep grades or mountains the vehicle should be locked in second gear to cause the engine to act as a brake to save the wear and tear of the braking mechanism. To accomplish this feature in this transmission it is only necessary to shift the disk 135 to position rollers 119 in the position shown in Fig. 9, and under these conditions the weight of the car causes the driven gear 48 to drive the planet gear 60 and the planet gear 58 causing the driver gear 40 to turn to drive the engine. It is a known fact that in a planetary type transmission when the driven gear drives the driver, the planetary carrier revolves in the same direction as that of the driver. In this instance the clutch rollers as shown in Fig. 9 by stopping the movement of rotation of the planet carrier in the direction of the driver, establish a definite relationship of gear ratio between the drive and driven shafts, and the compression of the engine is utilized as a braking means.

Instead of using the disk clutch mechanism and the pivoted shoe clutch mechanism that has been previously described in connection with Figs. 1, 3 and 10, I may use the construction shown in Figs. 15 and 16 wherein parts similar to the previously described construction have been given similar numerals and the other parts are specifically designated.

The second speed gear clutch in this instance has its hub portion 155 splined on the shaft 39 and provided with four equi-distantly spaced radially disposed studs 156. A segmental weight or shoe 157 is slidably mounted on each stud 156 and driven thereby and is provided with a clutch lining 158 engageable either with a drum 159 or with a drum extension 160 of the fly-wheel 22. The outward movement of these weights under the action of centrifugal force is resisted in each instance by a spring 161 interposed between the weight and a tension-adjusting nut 162 on the stud 156.

The engine clutch is of a similar construction in that it includes the weights 163, similar to the sector shaped weights 157 and slidably mounted on and driven from the studs 164 similar to the studs 156, and mounted in a spider or flanged disk 165 secured to the fly-wheel 22, these weights having their outward movement resisted by springs 166 interposed between them and nuts 167 on the studs 164 but movable when the engine gets above an idling speed into engagement with a drum surface 168. The drums 168 and 159, when used, are each connected to a disk or plate 169 secured to a drum 170 which in effect is the same member as the drum 61 of the first described construction. With this arrangement when the speed of the engine gets above an idling speed the weights 163, which are revolving therewith, are moved outwardly into frictional driving engagement with the drum surface 168 and this serves to revolve the drum that includes the parts 169 and 170 and through the overrunning clutch including the rollers 63, that have been previously described, drives the shaft 34 to accomplish the first speed drive as described in connection with the previous constructions.

When under these conditions the shaft 39 increases its speed and the hub 155 with the studs 156 reaches a predetermined speed of rotation, the weights 157 to move outwardly either into frictional driving contact with the drum surface 159 or with the extension surface 160 of the flywheel so that the drive then comes from the engine shaft 20 flywheel 22 to the shaft 39, it being noted that if the drum surface 159 is used that the drive is still through the flywheel since under these conditions the clutch elements 163 are engaged with the surface 168 and are being revolved by the disk 165 secured to the flywheel.

In Fig. 17 I have shown another arrangement in which a manually controlled clutch is used to connect the engine with the transmission instead of any automatic clutch and in this instance the numeral 171 designates a single disk or plate clutch element adapted to be normally held in clutching engagement with the face 172 of the fly-wheel 22 by means of the usual pressure plate 173 urged against the same by a plurality of springs 174 interposed between said plate and a ring 175 secured by bolts 176 to the rim of the fly-wheel. The disks, as in connection with the disks 71 of the first described construction, have a splined connection 177 with the splines 178 on the overrunning clutch drum 179 which drum corresponds to the drum 61 of the first described construction insofar as its overrunning clutch features are concerned, this clutch as before having the rollers 63 associated with the shaft 34. A thrust collar 180 is slidably mounted on the drum and is adapted to engage the usual clutch release levers 181, each of which are pivoted on pins 182 and have forked ends 183 engageable with studs or headed pins 184 mounted on the pressure plate 173 so that the inward movement of the collar 180 by the operator of the vehicle will move said levers 181 to move the pressure plate 173 outwardly to release the clutch against the action of the springs 174. The collar 180 may be shifted by the operator in any suitable manner and for this purpose I have shown a forked crank arm 185 mounted on a clutch pedal shaft 186 that carries the clutch pedal 187. Thus when this clutch is in, the transmission will be driven in low gear in the same manner that the first construction is driven when the automatic clutch is engaged.

For establishing the second speed relation an automatic clutch of the type like that shown in Figs. 15 and 16 is used in which the numeral 188 designates the segmental weights or shoes that are adapted to move radially outwardly on the studs 189 that drive them and which studs are secured to a hub 190 splined to the shaft 39, said weights moving outwardly against the resistance of springs 191 mounted between them and the nuts 192 into clutched engagement with the drum 193 whose hub 194 is keyed and made fast to the drum 179 so that, as in the previous constructions when the speed of the vehicle has reached a predetermined value to permit the weights 188 to move outwardly into clutch engagement with the drum 13, the drive for the transmission will be from the shaft 20, fly-wheel 22 through the manually controlled disk clutch and the drum 179, which are then revolving with the fly-wheel 22, to the drum 13, weights 188, studs 189 and hub 190 to the second speed drive shaft 39.

The controls for putting the vehicle into second gear directly while travelling in high gear, the reverse and the control for locking the vehicle in second gear, will now be described.

Referring to Figures 1, 2 and 13, it will be noted that there is mounted on a stud shaft 195 the usual brake pedal 196 and a pedal 197 preferably operable by the left foot of the driver provided with a crank arm 198 operatively connected by a link 199 with a crank arm 200 on a control shaft 201 journalled in a boss 202 on the casing 25 and which shaft at its other end carries an arm 203 working against a lug 204 on a shifter fork 205 slidably mounted on a shaft 206. This fork 205 has its bifurcations working in an annular groove 207 in the hub of the gear 129 so that as the pedal 197 is moved by the operator to turn the shaft 201 in a clockwise direction, the arm 203 engages the lug 204 and moves the fork 205 toward the right as viewed in Figures 1 and 2 and hence moves the clutch gear 129 out of mesh with the clutch gear 128 associated with the drum 120, this movement of the fork being opposed by a spring 208 mounted in a bore of the shaft 206 and engaged by pin 209 on the hub of the shifter fork working through a slot 210 in said shaft which limits the extreme positions of movement of the shifter fork and hence the gear 129.

Referring to Figures 2, 6 to 9, and 13, a rod 211 is slidably mounted in the instrument panel section of the dash of the vehicle and provided with a handle 212 for pushing and pulling the same, said rod being connected at its inner end to a lever 213 pivotally mounted at 214 on the dash 215 of the vehicle and operatively connected by a link 216 to a long lever 217, keyed to a shaft 218 journalled in a boss 219 in the casing 25 and carrying a segmental gear 220 meshing with the segmental gear 136 associated with the disk that shifts the rollers 119 of the brake for the planetary carrier. When the handle 212 is in the full line position shown in Fig. 14 the brake is in the neutral position shown in Fig. 7 and when said handle is in the inner dotted line position the brake is in the position shown in Fig. 8 for forward drive and when the handle is in the outer dotted line position the brake is in the position shown in Fig. 9 for locking in second for forward drive or releasing in reverse. Under conditions of reverse it has been noted that the shaft 39 will be held against rotation and consequently a connection from the lever 217 to the shaft 151 is made which connection however is designed to be disconnected from the lever 217 for independent operation of the shaft 218 so as to shift the rollers 119 to lock the transmission in second without actuating the control disk for the rollers 140. For this purpose the shaft 151 has a lever 221 mounted thereon, one arm of which is connected by a link 222 with a lever 223 whose hub 224 is loose on the shaft 218. The other arm of the lever 221 is connected by a spring 225 with the case and serves to move said lever 221 in a direction for forward drive although it is shown in Fig. 13 in neutral position. The lever 223 has an opening 226 in it intermediate its ends designed to be engaged by a clutch pin 227 which is normally urged to a locked position with the lever by a spring 228 interposed between said pin and an apertured boss 229 formed in the lever 217. A cap 230 is suitably secured to the stem of the pin 227 and has laterally extending lug 231 adapted to be engaged by a push-out cam 232 that is mounted to turn on the hub of the lever 217 and has an arm 233 moved in one direction by a spring 234 and in the other direction by the operator through a pull cord 235 extending over guide pulleys 236 and connected to a pull button 237 slidably mounted in the instrument panel portion of the dash of the vehicle. Thus the movement of the rod 211 serves to put the transmission in neutral, forward or reverse positions, it being noted that when this rod is in neutral position the roller brakes 119 and 140 are also in neutral position and when said rod is moved outwardly to reverse position the roller brakes 119 are shifted to the reverse position shown in Fig. 9 by the swinging of the levers 217 and since, under these conditions also, the lever 223 swings with the lever 217, the lever 221 turns the shaft 151 and through it gear 150, gear rack 149 and rotary disk 143 moves the rollers 140 to a position for locking the shaft 39 for reverse drive. When it is desired to lock the gear in second the button 237 is first pulled out which thus disengages the locking pin 227 from the lever 223 and then the movement of the rod 211 to the reverse position will put the planetary gear lock or brake including the clutch rollers 119 into the position shown in Fig. 9 to prevent the planetary carrier from turning as hereinbefore described.

The general operation of the transmission and its control by the operator is very simple. With the vehicle at rest and the parts in the neutral position shown in Fig. 13 the operator starts the engine in the usual manner. After the engine has run for a period sufficient to warm it up it is throttled down to idling speed and the operator shifts the handle 212 from neutral to forward position. Under these conditions this handle stays in this position under all ordinary conditions of driving and the operator proceeds from first to second gear automatically, although in one instance in the modification of Fig. 17 when the engine is started the clutch 171 is held in release position by the operator until after the engine is in a condition to drive the car, and from second to high as has been described in connection with the automatic clutch mechanism. If under such conditions of driving while the operator is proceeding in high gear he wishes to immediately proceed in second, he presses his foot down on the pedal 197 to release the high speed drum 120 from its drive and the vehicle immediately proceeds in second gear. If while driving down a hill he wishes to use the engine as a brake he may lock the vehicle in second by first putting the gear in second and then pulling out the button 237 to release the pin 227 and then pulling the handle 212 out to the reverse position so as to lock the brake mechanism of the planetary carrier against rotation as heretofore described. His changing from second to high under ordinary conditions of driving is dependent upon the relative speed of the car and the engine. If he desires to reverse the vehicle he pulls out the handle 212 to the reverse position when the car is standing still and then the engine is connected to drive the transmission at the same time he operates the pedal 197 to keep the clutch gears 128 and 129 disengaged.

It will be noted in Fig. 1 that the overrunning clutch including the rollers 63 and the drum 61 and the clutch members of the second speed automatic clutch, may all be assembled inside of the casing section 23 with the automatic brake including the rollers 140 associated with this section before bringing these parts into connection with the parts associated with the fly-wheel including the disk clutch and the drum 81 since the splined connection 73 and the other features of the construction readily permit this assembly. This same manner of assembly may be followed in connection with the modified constructions shown in Figs. 15 and 17.

The automatic clutch where used to connect the engine with the shaft 34 of the transmission is of course designed so that it will keep the engine in clutched engagement with the transmission when the engine is operating at any driving speed so as to keep the transmission in gear and its automatic operation makes the whole drive from the engine to the propeller shaft of the vehicle automatic so that the operator is relieved of the usual duty of shifting the engine clutch. The automatic clutch however is designed to be in disengaged position at the idling speed of the engine. It is also to be noted that the clutch gears 128 and 129 form jaw clutches and that the term clutch gear as used herein and in the claims is synonymous with jaw clutch member and is to be so construed.

It is also to be noted that when the automatic brake mechanism for the planetary gear carrier is in the position shown in Fig. 8, in which it holds the planetary gear carrier against reverse rotation, and the automatic brake mechanism for the shaft 39 is in the full line position shown in Fig. 6 in which said shaft 39 is held from being turned by the planet gears, that the vehicle will be prevented from rolling backwards down hill when parked thereon should there be any tendency for the vehicle wheels turning the shaft 43 and the gear 48.

I desire it to be understood that this invention is not to be limited to any particular form or arrangement of parts except insofar as such limitations are included in the claims.

What I claim as my invention is:

1. In an automatic change speed transmission mechanism, the combination of a plurality of drive gears of different diameters, a driven shaft, a driven gear, a planetary gear carrier having planet gears meshing with said drive gears and driven gear, a source of power, clutch mechanisms for connecting said drive gears with the source of power, one of said clutch mechanisms being automatically operable to connect its drive gear with said source of power on an increase in speed of the planet gears above a predetermined speed, automatic brake mechanism associated with said planetary carrier to prevent its tendency to rotate backwards, and automatically operable clutch mechanism for connecting said carrier to the driven shaft.

2. In an automatic change speed transmission mechanism, the combination of a plurality of drive gears of different diameters, a driven shaft, a driven gear, a planetary gear carrier having planet gears meshing with said drive gears and driven gear, a source of power, clutch mechanisms for selectively connecting said drive gears with said source of power, one of said clutch mechanisms including an overrunning clutch associated with the drive gear of smaller diameter, another of said clutch mechanisms being associated with the drive gear of larger diameter and operable automatically to connect said gear with said source of power on an increase in speed of the planet gears above a predetermined speed, automatic brake mechanism associated with said planetary carrier to prevent its tendency to rotate backwards, and automatically operable clutch mechanism for connecting said carrier to the driven shaft.

3. In an automatic change speed transmission mechanism the combination of a plurality of drive gears of different diameters, a driven shaft, a driven gear, a planetary gear carrier having a planet gears meshing with said drive gears and driven gear, a source of power, automatically operable clutch mechanisms for connecting said drive gears with said source of power for low and second speed, automatic brake mechanism for holding said planetary gear carrier stationary during the drive of said planet gears by said drive gears, and automatically operable clutch mechanism for connecting said carrier to the driven shaft for direct drive.

4. In an automatic change speed transmission mechanism, the combination of a plurality of drive gears of different diameters, a driven shaft, a driven gear, a planetary gear carrier having planet gears meshing with said drive and driven gears, a source of power, automatically operable clutch mechanisms for connecting said drive gears with said source of power for low and second speed, automatic brake mechanism for holding said planetary gearing stationary while operating in low and second speed, automatically operable clutch mechanism for connecting said carrier to the driven shaft for direct drive, reverse mechanism comprising means for releasing said brake mechanism to permit said planetary carrier to rotate about one of said drive gears, and means for holding one of the drive gears, about which said carrier rotates, stationary.

5. In an automatic change speed transmission mechanism, the combination of a drive shaft, a driven shaft, a single multi-speed planetary gear unit between said shafts including a planetary gear carrier, driven, drive and reduction gears, means for connecting said drive shaft with the low speed gear of said unit, means responsive to an increase in speed of the driven shaft for connecting said drive shaft with the second speed gear of said unit, automatic brake mechanism for the planetary carrier, and speed responsive clutch mechanism for connecting said carrier to said driven shaft for direct drive.

6. In an automatic change speed transmission mechanism, the combination of a drive shaft, a driven shaft, a single multi-speed planetary gear unit between said shafts, including a planetary gear carrier, means for connecting said unit with said shafts to drive the driven shaft at low speed, means responsive to an increase in speed of the driven shaft for connecting said unit with said shafts to drive the driven shaft in second speed, brake mechanism for the planetary gear carrier to prevent its reverse rotation in low and second speed, means responsive to changes in speed for connecting said unit for rotation with both shafts for direct drive, and means for connecting said unit with said shafts for relative rotation of said planetary carrier with said shafts for reverse drive.

7. In an automatic change speed transmission, the combination of a drive shaft, a driven shaft, a single multi-speed planetary gear unit between said shafts including a planetary gear carrier, driven, drive and reduction gears, means for connecting said drive shaft with the low speed gear of said unit, means responsive to an increase in speed of the driven shaft for connecting said drive shaft with the second speed gear of said unit, automatic brake mechanism for the planetary gear carrier, means responsive to changes in speed for connecting said unit for rotation with both shafts for direct drive, and mechanism for releasing said brake mechanism and for locking the unit in second gear.

8. In an automatic transmission mechanism, the combination of a plurality of drive gears of different diameters, a driven shaft, a driven gear, a planetary gear carrier having planet gears meshing with said drive gears and driven gear, a source of power, clutch mechanisms for selectively connecting said drive gears with said source of power for low and second speed, including an overrunning clutch to release one of said drive gears when the mechanism is being driven by the other drive gear, automatic brake mechanism for holding said planetary gear carrier stationary for low and second speed, automatically operable clutch mechanism for connecting said carrier to the driven shaft for direct drive, and mechanism for securing a reverse comprising means for releasing said automatic brake mechanism and brake mechanism for holding one of said drive gears stationary while driving the driven gear through said planet gears from the other drive gear.

9. In a transmission mechanism, the combination of a drive shaft, a driven shaft, a variable speed planetary gear unit between said shafts including a planetary gear carrier, brake mechanism for said carrier automatically operable to hold said planetary carrier against reverse rotation when in gear, automatically operable clutch mechanism for connecting said carrier to said driven shaft and operable in response to a change in relative speed of said shafts, and means to reverse the action of said brake mechanism to automatically prevent rotation of said carrier by the driven shaft when the unit is driven by the driven shaft.

10. In a transmission mechanism, the combination of a drive shaft, a driven shaft, a variable speed planetary gear unit between said shafts including a planetary gear carrier, brake mechanism for said carrier automatically operable to hold said carrier against reverse rotation when in gear, and means to reverse the action of said brake mechanism to automatically prevent rotation of said carrier by said driven shaft when the unit is driven by the driven shaft.

11. In an automatic transmission mechanism, the combination of a driving element, a planetary change speed transmission unit including a planetary gear carrier and its planet gears and a pair of drive gears of different diameters meshing with certain of said planet gears, drive shafts for said drive gears, centrifugally operable clutch mechanism and an overrunning clutch for connecting one of said drive shafts to said driving element for one speed ratio of the gear unit, centrifugally operable clutch mechanism responsive to an increase in speed of the planet gears for connecting the other drive shaft to said driving element for a second speed ratio of the gear unit, and means for automatically holding said planetary gear carrier stationary during the operation of the unit in said speed ratios.

12. In an automatic transmission mechanism, the combination of a driving element, a driven shaft, a planetary change speed transmission unit between said element and said driven shaft including a planetary gear carrier and its planet gears, and a pair of drive gears of different diameters meshing with certain of said planet gears, drive shafts for said drive gears, centrifugally operable clutch mechanism and an overrunning clutch for connecting one of said drive shafts to said driving element for one speed ratio of the gear unit, centrifugally operable clutch mechanism responsive to an increase in speed of the planet gears for connecting the drive shaft to said driving element for a second speed ratio of the gear unit, means for automatically holding said planetary gear carrier stationary during the operation of the unit in said speed ratios, and speed responsive clutch mechanism for connecting said planetary gear carrier to the driven shaft for the direct drive from the driving element through one of said drive shafts and said gear unit.

13. In an automatic transmission mechanism the combination of a driving element, a drum operatively associated with said element, a pair of drive shafts, a centrifugally operable clutch between one of said shafts and said driving element and operable on an increase in speed of said element, speed responsive clutch elements mounted on the other of said drive shafts and operable in response to an increase in speed thereof for connecting said drum to said shaft, an overrunning clutch for the drive shaft associated with the first named clutch, a one-way automatic brake for the drive shaft associated with said clutch elements, a driven shaft, and variable speed gearing connecting said driven shaft with said drive shafts and operable to change the speed ratio between said driving element and said driven shaft.

14. In an automatic change speed transmission mechanism the combination of a drive shaft, a driven shaft, a variable speed transmission gear unit between said shafts, automatic clutch mechanisms associated with said unit and said shafts, one of said clutch mechanisms being automatically operable upon an increase in speed of the drive shaft above a predetermined speed to drive the driven shaft through said unit at one gear ratio, another of said clutch mechanisms being automatically operable on an increase in speed of the driven shaft above a predetermined speed to drive the driven shaft through said unit at another gear ratio, and another of said clutch mechanisms being automatically operable on a relative change in speed of the drive and driven shafts to connect said shafts through said unit for direct drive.

15. In an automatic change speed transmission, the combination of a drive shaft, a driven shaft, a single multi-speed planetary gear unit between said shafts including a planetary gear carrier, driven, drive and reduction gears, means for connecting said drive shaft with the low speed gear of said unit, means responsive to an increase in speed of the driven shaft for connecting said drive shaft with the second speed gear of said unit, automatic brake mechanism for the planetary carrier, speed responsive clutch mechanism for connecting said carrier with said driven shaft for direct drive including a drum, and a manually controlled clutch for connecting or disconnecting said drum with said driven shaft.

16. In a change speed transmission, the combination of a pair of drive shafts, a driven shaft, and a planetary gear unit between said shafts, an automatic brake for one of said drive shafts comprising automatic brake elements, and manually operated means for shifting the position of said elements into and out of braking position.

17. In a change speed transmission, the combination of a pair of drive shafts, a driven shaft, a variable speed planetary gear unit between said shafts including a planetary gear carrier, shiftable automatic brake mechanism for the planetary gear carrier, shiftable automatic brake mechanism for one of said drive shafts, and control means for said brake mechanisms for conjointly shifting the same.

18. In a change speed transmission, the combination of a pair of drive shafts, a driven shaft, a variable speed planetary gear unit between said shafts including a planetary gear carrier, shiftable automatic brake mechanism for said planetary gear carrier, shiftable automatic brake mechanism for one of said drive shafts, and control means for said brake mechanisms for conjointly shifting the same and for shifting the automatic brake mechanism of the planetary carrier independent of said brake mechanism for said drive shaft.

19. In an automatic change speed transmission mechanism the combination of a drive shaft, a driven shaft, change speed planetary gearing between said shafts including a planetary gear carrier driven, drive and reduction gears, a drum loosely mounted on the driven shaft, releasable jaw clutch mechanism for connecting said drum with said driven shaft, clutch elements associated with said planetary gear carrier for connecting the same with said drum, and means for automatically aligning the parts of said jaw clutch mechanism for permitting the quiet engagement thereof.

20. In a change speed transmission mechanism, the combination of a pair of drive shafts, a driven shaft, a planetary gear unit between said shafts including drive gears, a driven gear and a planetary gear carrier and planet gears mounted on said carrier, automatic brake mechanism for one of said drive shafts comprising automatic brake elements, means for shifting said elements to different operating positions, said elements being shiftable to one position to prevent rotation of the aforementioned drive shaft for reverse drive through said planetary carrier and shiftable to another position to prevent turning of said shafts by the planet gears when the planetary carrier is stationary.

21. In an automatic change speed transmission mechanism, the combination of a drive shaft, a driven shaft, change speed planetary gear transmission between said shafts including a planetary gear carrier, a drum associated with the driven shaft, centrifugally operable clutch members rotatable with the planetary gear carrier and adapted to connect said carrier to said drum to connect said drive and driven shafts together through said transmission, said clutch members having an inclined toothed engagement with said drum providing a release between said members and said drum on an increase in torque of the drive shaft over that of the driven shaft.

22. In an automatic change speed transmission, the combination of a pair of drive shafts, a driven shaft and a variable speed planetary gear unit between shafts including a planetary gear carrier, driven, drive and reduction gears, means for automatically establishing a driving relation through said unit with either of said drive shafts, an overrunning clutch for releasing the drive for one of said drive shafts during the drive of said unit by the other drive shaft, automatic brake mechanism associated with said other drive shaft, automatic brake mechanism associated with said planetary carrier, and means for shifting said brake mechanisms to release said automatic brake mechanism of the planetary gear carrier and render said automatic brake mechanism for the other drive shaft operative to prevent rotation of said shaft and establish direct reverse drive through said gear unit.

23. In a change speed transmission mechanism, the combination of a drive shaft, a driven shaft, a single multi-speed planetary gear unit between said shafts including a planetary gear carrier, driven, drive and reduction gears, means for connecting said drive shaft with the low speed gear of said unit, speed responsive clutch mechanism for connecting said drive shaft with the second speed gear of said unit, brake mechanism for the planetary gear carrier to prevent reverse rotation thereof while in gear, and speed responsive clutch mechanism for connecting said carrier to said driven shaft for direct drive.

24. In a change speed transmission, the combination of a pair of drive shafts, a driven shaft, a variable speed planetary gear unit between said shafts including a planetary gear carrier, shiftable automatic brake mechanism for said planetary gear carrier, shiftable brake mechanism for one of said drive shafts, and control means for said brake mechanisms for conjointly shifting the same and for shifting the automatic brake mechanism of the planetary carrier independently of said brake mechanism for said drive shaft.

25. In a change speed transmission, the combination of a drive shaft, a driven shaft, a single multi-speed planetary gear unit between said shafts including a planetary gear carrier, means for connecting said drive shaft with the low speed gear of said unit, speed responsive means for connecting said drive shaft with the second speed gear of the unit, automatic brake mechanism for the planetary gear carrier, speed responsive clutch mechanism for connecting said carrier with the driven shaft for direct drive, and manually operable clutch mechanism between said speed responsive clutch mechanism and said driven shaft for connecting or disconnecting said driven shaft from said speed responsive clutch mechanism.

26. In a change speed transmission mechanism, the combination of a drive shaft, a driven shaft, change speed planetary gearing between said shafts including driven, drive and reduction gears and a planetary gear carrier, a member loosely mounted on said driven shaft, releasable jaw clutch mechanism for connecting said member with said driven shaft, speed responsive clutch mechanism for connecting said planetary gear carrier with said member, and means for automatically aligning the parts of said jaw clutch mechanism for permitting the quiet engagement thereof.

27. In a change speed transmission mechanism, the combination of a drive shaft, a driven shaft, a planetary gear unit between said shafts including a planetary gear carrier, a member mounted on said driven shaft, releasable jaw clutch mechanism for connecting said member with said driven shaft, comprising a clutch element on said member, and a clutch element on said driven shaft, speed responsive clutch mechanism for connecting said planetary gear carrier with said member, and a releasable detent in said driven shaft engageable with said member when the elements of said jaw clutch mechanism are in alinement for intermeshing to permit quiet engagement thereof.

28. In a change speed transmission for automotive vehicles, the combination of a driving element, a driven shaft, a change speed planetary gearing including a planetary gear carrier and its planet gears and a pair of drive gears of different diameters meshing with certain of said planet gears, drive shafts for said drive gears, clutch mechanisms for selectively connecting said drive shafts with said driving element for establishing different speed ratios of the gearing, means for automatically holding said planetary gear carrier stationary while said gearing is in gear, speed responsive clutch mechanism for connecting said planetary gear carrier to the driven shaft for the direct drive from the driving element through one of said drive shafts and said gearing, and a one way brake for one of said drive shafts acting through said gearing to prevent the vehicle rolling backwards when said gearing is turned in a reverse direction by said driven shaft.

In testimony whereof, I affix my signature.

OSCAR H. BANKER.